United States Patent [19]
Brandt

[11] Patent Number: 5,462,365
[45] Date of Patent: Oct. 31, 1995

[54] COMPOSITE RADIAL-AXIAL PLAIN BEARING

[75] Inventor: Horst Brandt, Weiterstadt, Germany

[73] Assignee: Glyco-Metall-Werke Glyco B.V. & Co. KG, Wiesbaden, Germany

[21] Appl. No.: 290,797

[22] PCT Filed: Feb. 18, 1993

[86] PCT No.: PCT/DE93/00161

§ 371 Date: Oct. 24, 1994

§ 102(e) Date: Oct. 24, 1994

[87] PCT Pub. No.: WO93/17250

PCT Pub. Date: Sep. 2, 1993

[30] Foreign Application Priority Data

Feb. 19, 1992 [DE] Germany ............................ 42 04 988.1
Feb. 10, 1993 [DE] Germany ............................ 43 03 855.7

[51] Int. Cl.[6] .................................. F16C 9/02; F16C 17/10
[52] U.S. Cl. ............................................. 384/294; 384/275
[58] Field of Search .................................... 384/275, 288, 384/294, 429, 430

[56] References Cited

U.S. PATENT DOCUMENTS

| | | | |
|---|---|---|---|
| 4,924,523 | 5/1990 | Gojon | 384/275 X |
| 5,062,718 | 11/1991 | Lenhard-Backhaus et al. | 384/294 |
| 5,114,246 | 5/1992 | Gowan | 384/294 X |

FOREIGN PATENT DOCUMENTS

| | | |
|---|---|---|
| 184693 | 6/1983 | European Pat. Off. . |
| 3933667 | 1/1991 | Germany . |
| 4041557 | 6/1992 | Germany . |
| 2134189 | 8/1984 | United Kingdom . |
| 2241752 | 9/1991 | United Kingdom . |

*Primary Examiner*—Thomas R. Hannon
*Attorney, Agent, or Firm*—Lawrence J. Shurupoff

[57] ABSTRACT

In a composite plain thrust journal bearing is provided, in the inner rim of the thrust bearing part, at least one retaining lug (5) with which is associated at least one splay finger (6). In the rim area (7) of the journal bearing part are provided for the retaining lug a recess (13) and a recess (18) for a splay finger which is formed, at least in an end region, into a receiving slot (8), which is axially delimited by a hook-shaped projection (9). When the thrust bearing part (2) is positioned on the journal bearing part (1), the retaining lug (5) is engaged into the recess (13) and the splay finger into the recess (18) for a splay finger, and then the splay finger (6) is, under permanent deformation introduced into the receiving slot (8) behind the hook-shaped projection (9). This method of attachment offers defined limited mutual movability of the journal bearing part (3) and the thrust bearing part (2) while ensuring reliable connection of the two parts to each other. According to a further embodiment the splay fingers are arranged spaced from the retaining lugs and engage into their own recesses for splay fingers.

18 Claims, 10 Drawing Sheets

COMPOSITE RADIAL-AXIAL PLAIN BEARING

BACKGROUND OF THE INVENTION

1. Field of the Invention

The invention relates to a composite plain thrust journal bearing having a journal bearing part in the form of a half-liner or bush on one or both sides of which is mounted a ring-part shaped thrust bearing part or a set of thrust bearing parts, every thrust bearing part having at is inner peripheral edge at least two retaining lugs, each of which engages into a recess provided in the region of the arcuate or circular rim of the journal bearing part, at least one retaining lug being flanked, as an attachment lug, with at least one splay finger, which engages in an undercut made in the associated attachment recess of the journal bearing part.

2. Description of Prior Developments

Composite plain thrust journal bearings are known from a number of prior publications. They have an advantage in comparison with a one-piece plain thrust journal bearing (flange bearing) in that a different material may be chosen for the journal bearing part than for the thrust bearing part so that an optimum material adaptation to particular loading conditions is possible. To keep the wear of the parts in the composite plain thrust journal bearing low, centering and fixing of the bearing parts with respect to each other is of great importance, while a certain movability of the thrust bearing part with respect to the journal bearing part is desirable at least for the assembly of the plain bearing.

From EP 298 953 B 1 is known such a plain thrust journal bearing composed of a half-liner and a separate thrust flange, in which, for the attachment of the thrust flange to the half-liner, the latter is provided with insertion recesses which are open towards the outer rim and form an undercut in the form of a dovetail effective in the axial direction. On the thrust flange are provided fixing extensions which correspond to these insertion recesses and which are formed by tongues bent in an axial direction. In these known plain thrust journal bearings the retaining lugs must be very long and bent very accurately. For the connection of the thrust flange to the bearing liner the thrust flange is slipped over the bearing half-liner in a radial direction. If all fixing extensions corresponding to the insertion recesses have dovetail form, it is necessary to elastically deform the bearing half-liner by compression such that the fixing extensions may be inserted into the fixing recesses. Apart from the fact that damage can be caused by this elastic deformation to the shape and coating of the bearing half-liner, such an elastic deformation is at all possible only with bearing half-liners and not with bearing bushes.

In EP 298 953 B 1 is therefore considered a second possibility for the insertion of the fixing extensions into the insertion recesses in that a central fixing extension is first formed rectangularly and with preformed splay fingers and, after positioning of the thrust flange on the bearing half-liner, these splay fingers are widened into the dovetail form of the insertion recess. This widening in the dovetail form is difficult in the case of bent fixing extensions and brings with it the danger of damage to the journal bearing part. In addition the parts of a fixing extension bent to the dovetail form bring about only conditional strength and reliability of attachment because they act inside the dovetail-shaped insertion recess only as wedge-shaped retaining elements which are deformed during relative movement between the thrust flange and the journal bearing part and are thereby increasingly loosened in the insertion recess.

From the later published older German Patent Application DE 41 40 277 A1 is also known a composite plain thrust journal bearing in which a retaining lug of the thrust bearing part, serving as an attachment lug, is inserted into a closed retaining opening formed in the peripheral rim of the journal bearing part and subsequently is shaped into a nose extending over the journal bearing part. This can ensure a reliable and lasting holding and defined limitation of the axial spacing of the thrust bearing part with respect to the journal bearing part, but formation of the nose on the attachment lug requires high accuracy and exceptional care to avoid damage to the bearing parts.

SUMMARY OF THE INVENTION

The aim of the invention is, therefore, to provide a composite plain thrust journal bearing which ensures on the one hand reliable attachment of the thrust bearing part on the journal bearing part with defined limitation of the mutual movability of the bearing parts, and on the other hand enables an exceptionally simple assembly of the thrust bearing part and journal bearing part with only a few simple operational steps which are not dangerous to the bearing parts.

In comparison with the splaying of fingers and widening of an attachment lug in a dovetail form, this lateral splaying of the splay finger and insertion into a receiving slot have the advantage that the accuracy of size and defined limitation of the movability may be set during the manufacture of the bearing parts with sufficiently high accuracy and without any difficulties. The assembly of the journal bearing part and the thrust bearing part and the splaying of the splay finger and insertion into the receiving slot are particularly simple operational steps which do not require elastic deformation of the bearing parts themselves and there is no danger that the bearing parts could be damaged.

It may be particularly easily arranged within the framework of the invention that the splay finger or fingers is or are arranged in the circumferential direction of the thrust bearing part to flank the attachment lug and is or are separated from the attachment lug over their whole length by a cut or a slit. This makes the lateral splaying of the splay finger or fingers particularly simple and reliable without the need for any deformation of the attachment lug.

The thrust bearing part may have, according to the invention, one or more additional retaining lugs as guiding lugs without splay fingers, with each of which is associated on the rim of the journal bearing part a retaining opening which is at least partly, preferably fully axially closed. Such guiding lugs improve not only the bond of the bearing parts, but also the defined limitation of mutual movability of the bearing parts.

In a preferred embodiment of the invention every thrust bearing part has in the apex region of its radial inner edge a guiding lug and on both sides, preferably at the same angular distance, an attachment lug, every attachment lug being flanked by a splay finger at least on the side facing away from the guiding lug. In this embodiment are achieved particularly good conditions for mutual attachment and limited movability of the journal bearing part and thrust bearing part. The assembly of the parts to a fully assembled plain thrust journal bearing may be made simply and inexpensively. To be able in addition to limit in a defined manner the axial movability of the thrust bearing part and the journal bearing part and keep the radial movability of the thrust bearing part on the journal bearing part as low as possible, it is possible, within the framework of the invention, to provide the thrust bearing part in the apex region of its inner edge with a support rim projecting radially inwardly with respect to the inner edge, the support rim extending on both sides of the guiding lug.

The support rim may also be provided when the thrust bearing part has no guiding lug, and the support rim extends partly or fully along the inner edge of the thrust bearing part. When the support rim is provided also in the region of the splay finger, this increases the stability of the retaining finger.

This support rim is situated in an arcuate region on the rim of the journal bearing part and offers thereby, in operation, a reliable support of the thrust bearing part on the journal bearing part.

In another embodiment of the invention the thrust bearing part has at one side of its apex region angularly spaced therefrom a retaining lug and at the other side of the apex region angularly spaced therefrom an attachment lug.

In a further embodiment of the invention the thrust bearing part may have at both sides, in each case angularly spaced from its apex region, an attachment lug. The two last mentioned embodiments may be selected according to the envisaged field of application of the respective composite plain thrust journal bearing. In both the last mentioned embodiments a splay finger may be associated with each attachment lug, the finger being preferably situated on the side of the attachment lug which faces away from the apex region of the thrust bearing part. An increased safety of attachment of the thrust bearing part on the journal bearing part may be obtained in the last two mentioned embodiments in that each attachment lug is, at both sides, flanked by a splay finger each of which engages in a splayed state in a receiving slot of the recess receiving the attachment lug.

When the splay finger engages into its own recess in the journal bearing part, the forces acting in the circumferential direction are taken up primarily by the retaining lug or lugs so that the splay finger or fingers are relieved of load and may serve their proper function as a connection element.

The splay fingers are preferably so arranged, that in cases when the edge of the recess bears onto the retaining lug, the splay finger or fingers still have a spacing in the associated recess so that loading of the splay finger in circumferential direction is reliably avoided. This may me achieved in that the spacing of the splay fingers in their recess is greater than the spacing of the retaining lugs in the recesses with which they are associated.

The arrangement of the splay fingers with respect to the retaining lugs is possible in various manners. According to the arrangement and number of the retaining lugs, the splay fingers may be arranged on one or both sides spaced from the retaining lug or lugs. It is also possible to provide in one recess two splay fingers which engage, in splayed state, in their own receiving slot.

BRIEF DESCRIPTION OF THE DRAWINGS

Embodiments of the invention will now be explained in greater detail, by way of example, with reference to the drawings. In the drawings.

BRIEF DESCRIPTION OF THE PREFERRED EMBODIMENTS

In the examples illustrated in the drawings is shown a plain thrust journal bearing 1, the journal bearing part 3 of which is in the form of a substantially semi-cylindrical bearing liner. The thrust bearing part 2 is formed by a semi-circular thrust washer situated on one side or both sides of an arcuate end rim 7 of the journal bearing part 3. The thrust bearing part 2 has on its peripheral rim radially inwardly extending retaining lugs 5 and guiding lugs 4 which engage into corresponding recesses 11, 13 on the rim 7 of the journal bearing part 3.

In the example shown in FIGS. 1 to 4 the thrust bearing part is provided with a central guiding lug 4 flanked by two attachment lugs 5 at an angular distance of about 30° or more. Between the central guiding lug 4 and the attachment lugs 5 flanking it is provided a support rim 15 which projects with respect to the inner periphery of the thrust bearing part 2. The guiding lug 4 engages into a closed retaining opening 11 while for the two attachment lugs 5 attachment recesses 13 are provided in the rim 7 of the journal bearing part 3. The inner edge 11a of the closed retaining opening 11 and the bottom edge 13a of the attachment recesses 13 are aligned with each other.

Figure 1:
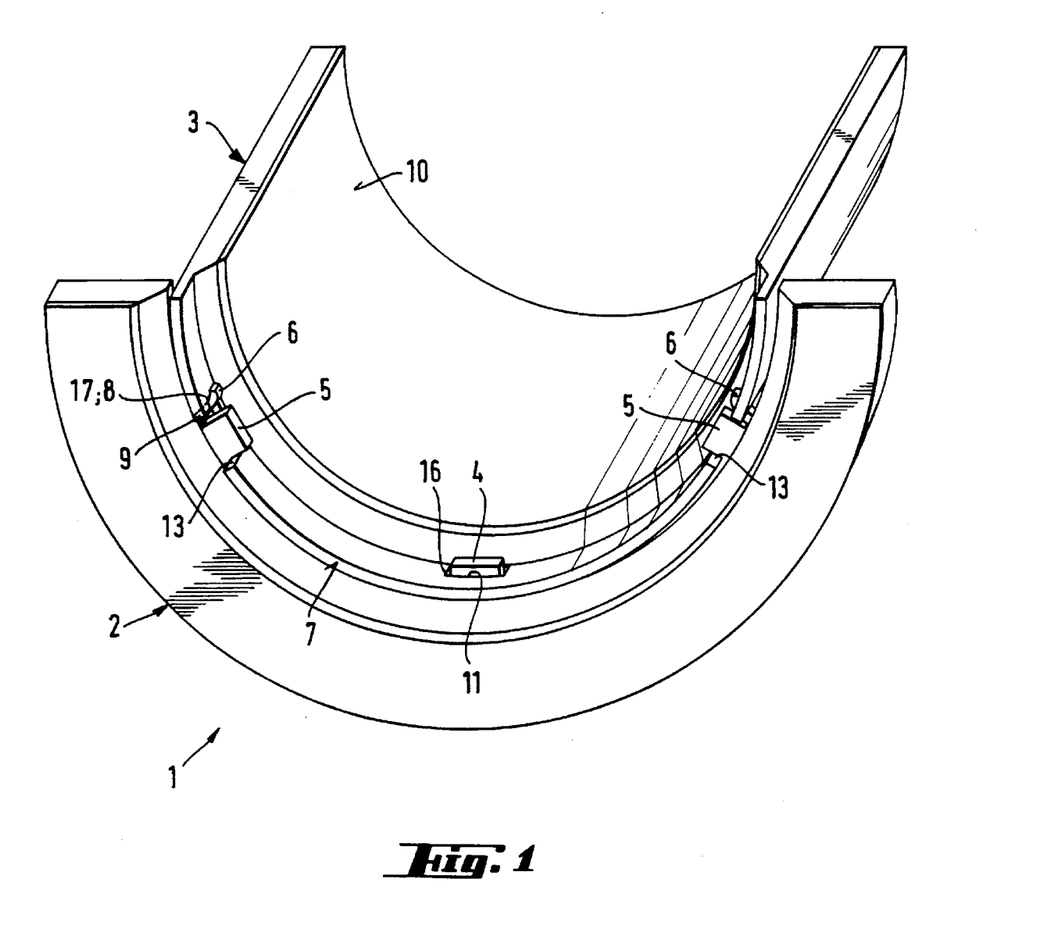
FIG. 1 is a perspective view of a composite plain thrust journal bearing in a first embodiment.
Figure 2:
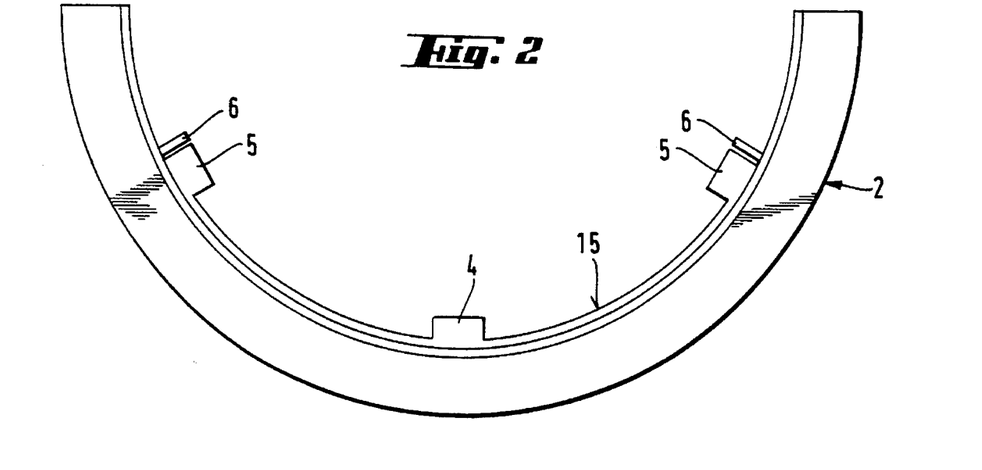
FIG. 2 is a plan view of a thrust bearing part according to FIG. 1 before assembly.
Figure 3:
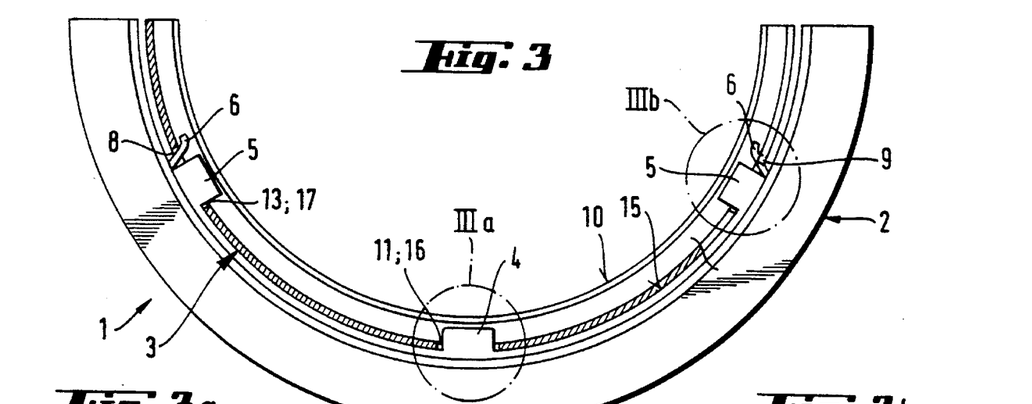
FIG. 3 is a plan view of a thrust bearing part according to FIG. 1 assembled with a journal bearing part.
Figure 3A:
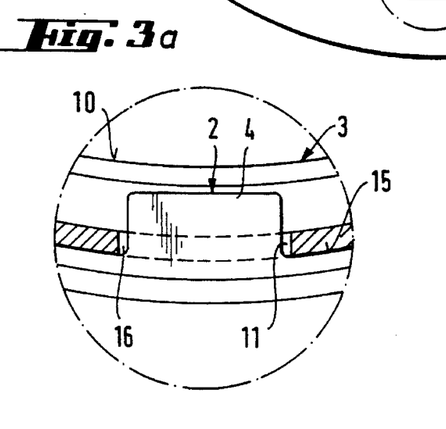
FIGS. 3a, 3b are details IIIa and IIIb from FIG. 3 on a larger scale.
Figure 3B:
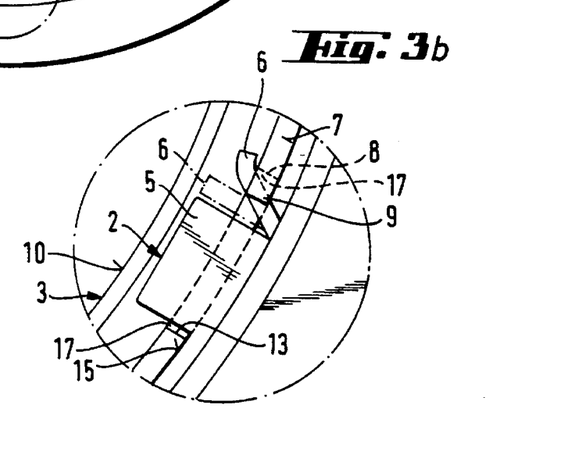

As is apparent from FIG. 2, every attachment lug 5 is on the side facing away from the guiding lug 4 flanked by a splay finger 6. Between the splay finger 6 and the attachment lug 5 is made a slit extending up to the base of the attachment lug 5, to enable a corresponding tool to be inserted therein for the splaying of the splay finger 6 from the attachment lug 5.

Figure 4:
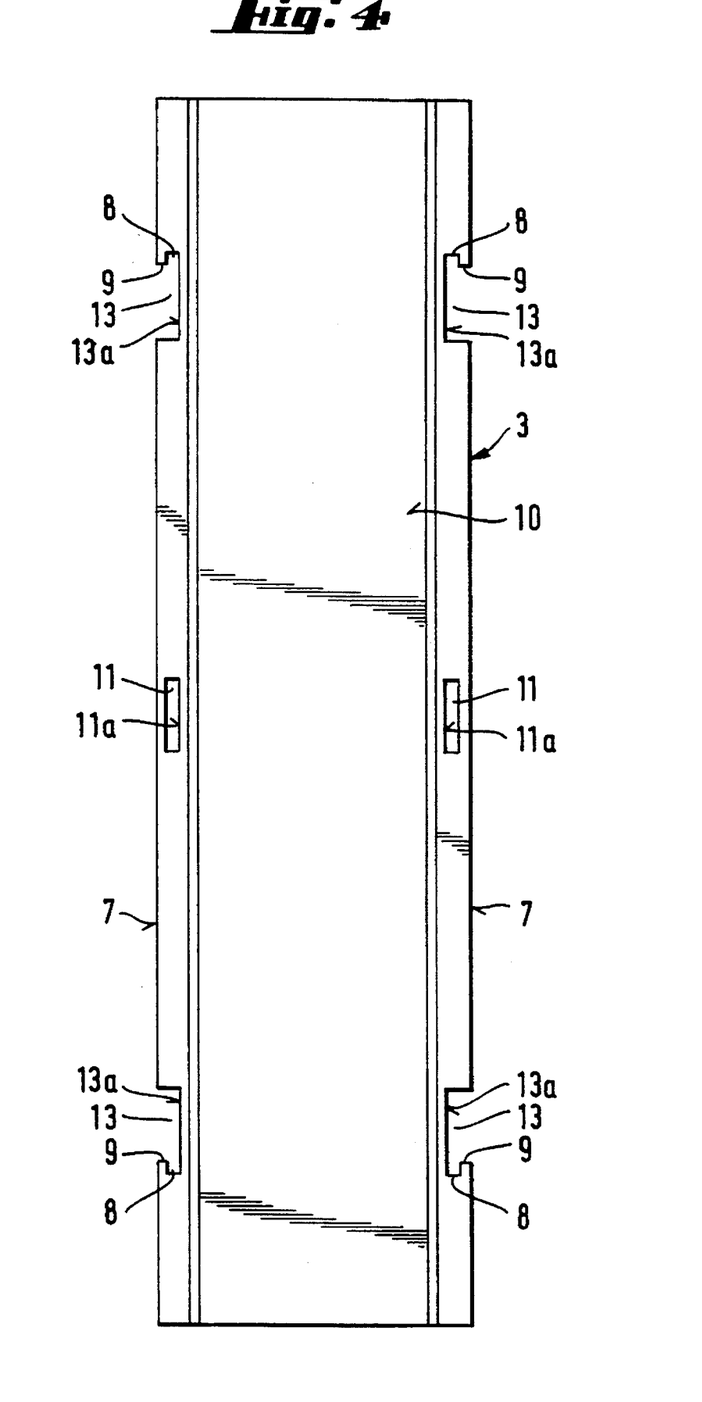
FIG. 4 is a front elevation of an unwound or flattened journal bearing part according to FIG. 1.

As is shown in FIG. 4, each of the attachment recesses 13 has at its end facing away from the central closed retaining opening 11, a receiving slot 8 which is axially outwardly delimited by a hook-shaped projection 9 such that a support edge for the splay finger is provided in the receiving slot 8 on the hook-shaped projection 9, the support edge being substantially parallel to the bottom edge 13a of the attachment recess 13.

Compared to the dimensions of the guiding lug 4, the dimensions of the closed retaining opening 11 are such that the guiding lug 4 has in the closed retaining opening a certain spacing 16 in the circumferential direction of the bearing and a small spacing in the axial direction of the bearing. Also the dimensions of the attachment recess 13 and the receiving slot 8 are such that the attachment lug 5 and the splay finger 6 have a spacing 17 in the assembled state of the plain thrust journal bearing.

For the assembly of a plain thrust journal bearing in the embodiment according to FIGS. 1 to 4 the thrust bearing part 2, which is in the state shown in FIG. 2, is first inserted slightly obliquely to the end edge of the journal bearing part 3 and introduced in the apex region by the guiding lug 4 in the closed retaining opening 11 in the rim of the journal bearing part 3 until the support rim 15 engages the outer peripheral surface of the journal bearing part 3. The thrust bearing part 2 is then swung in such a way that both its attachment lugs 5 and splay fingers 6 get into the attachment recesses 13. After that the splay fingers 6 are splayed away from the respective attachment lugs 5 and are inserted with permanent deformation by bending in the corresponding receiving slot 8. The thrust bearing part 2 is thereby permanently and reliably fixed to the journal bearing part 3, and due to the spacing 16 of the guiding lug 4 in the closed retaining opening 11 and the spacing 17 of the attachment lugs 5 in the attachment recesses 13 and the spacing 19 of the splay finger 6 in the receiving slots 8, acquires movability with respect to the journal bearing part 3 which is suitable for the assembly and operation of the bearing. Relative movements of the thrust bearing part 2 with respect to the journal bearing part 3 in the operation of the plain thrust journal bearing 1 cannot cancel the performed deformation of the splay finger 6 by bending, because the contact edge of the hook-shaped projection 9, which edge is parallel to the bottom edge 13a of the attachment recess 13, has no wedge effect and besides the movability of the thrust bearing part 2 on the journal bearing part 3 is limited by the provided spacing 16 of the guiding lug 4 in the retaining opening 11 and the attachment lugs 5 in the attachment recesses 13. The splay fingers 6 serve here only as connection elements.

Figure 5:
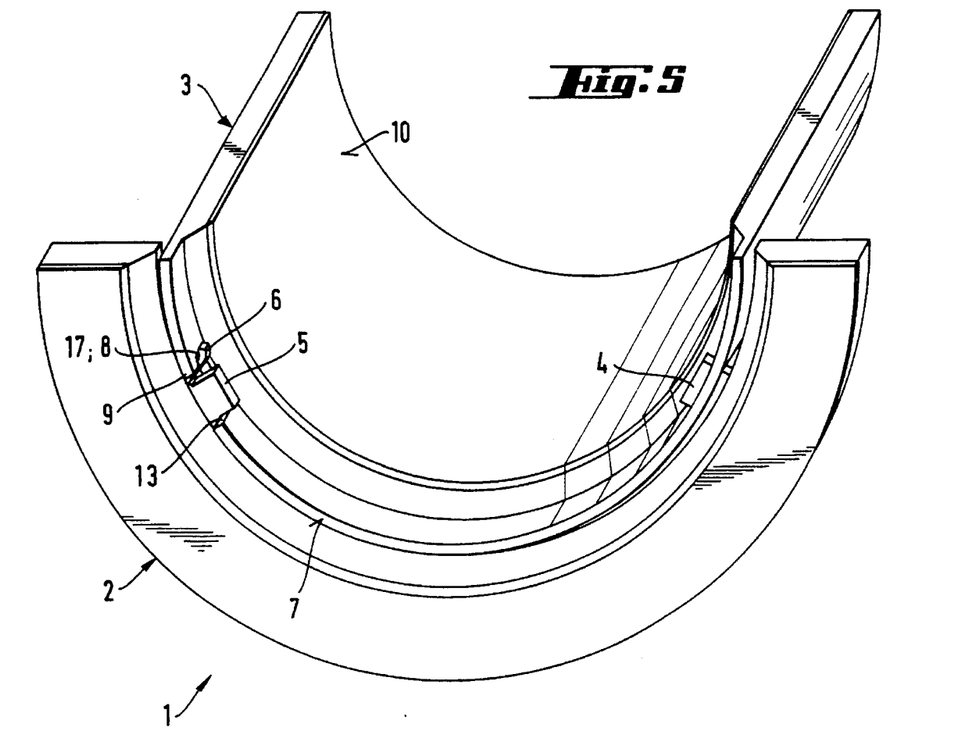
FIG. 5 is a perspective view of a composite plain thrust journal bearing in a second embodiment.
Figure 6:
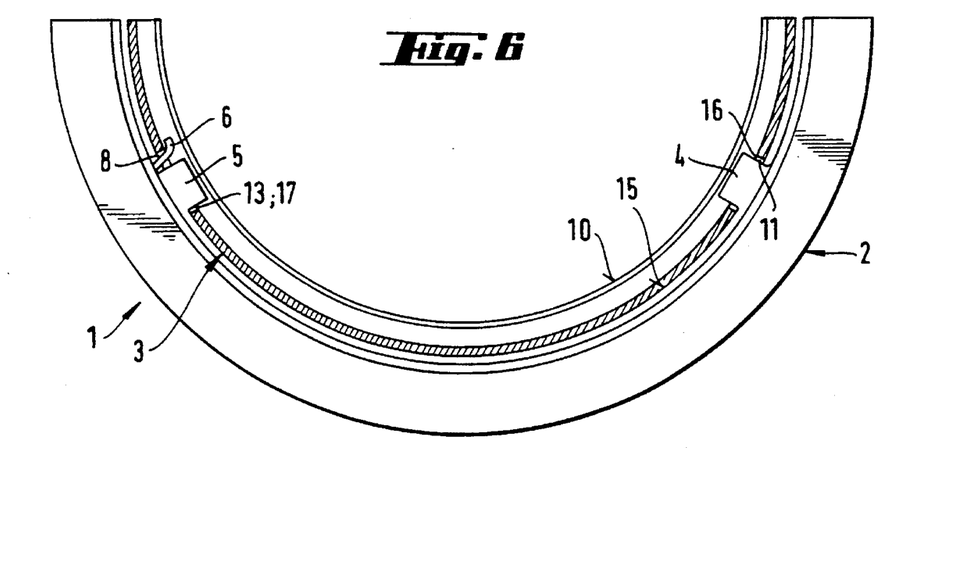
FIG. 6 is a plan view of a thrust bearing part and a journal bearing part, cut on the rim, of a thrust journal bearing according to FIG. 5.

In the embodiment of the plain thrust journal bearing 1 according to FIGS. 5 and 6, applicable for special purposes, the thrust bearing part 2 has only two lugs extending radially inwardly, namely one guiding lug 4 and one attachment lug 5. In the rim area 7 of the journal bearing part 3 is correspondingly provided one closed retaining opening 11 and one axially open attachment recess 13. For the formation of the receiving slot 8 and the hook-shaped projection 9 at the attachment recess 13 for the introduction of the splay finger 6 are provided the same features which have been explained above in connection with FIGS. 1 to 4. The same applies also to the spacing 16 of the guiding lug 4 in the retaining opening 11 and the spacing 17 of the attachment lug 5 in the attachment recess 13.

Figure 7:
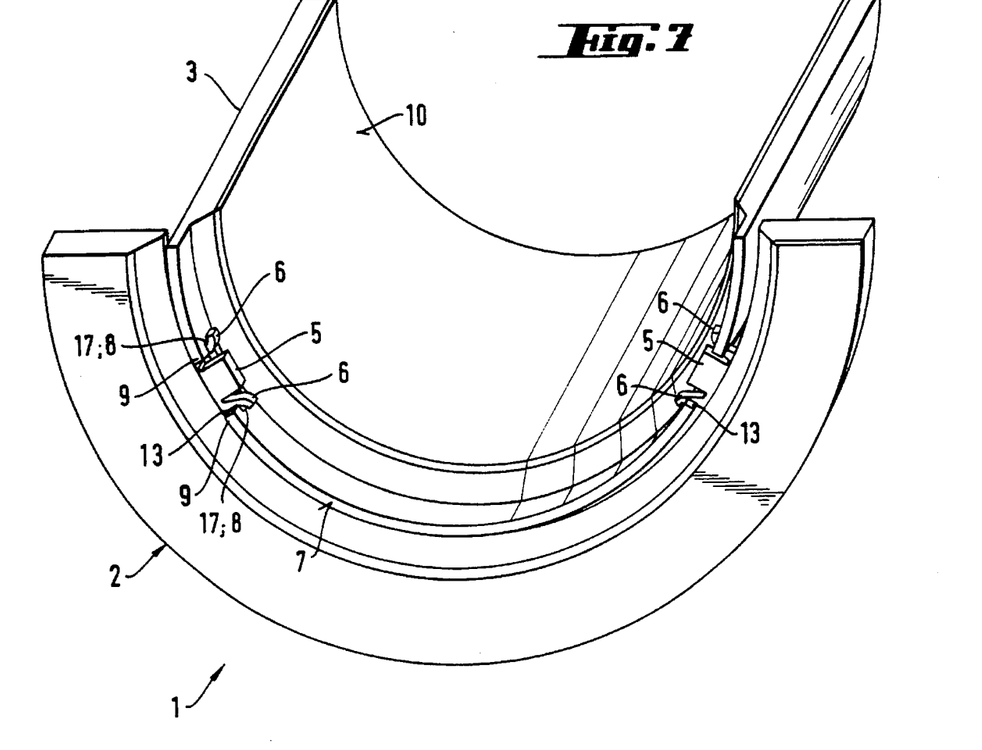
FIG. 7 is a perspective view of the composite plain thrust journal bearing in a further embodiment.
Figure 8:
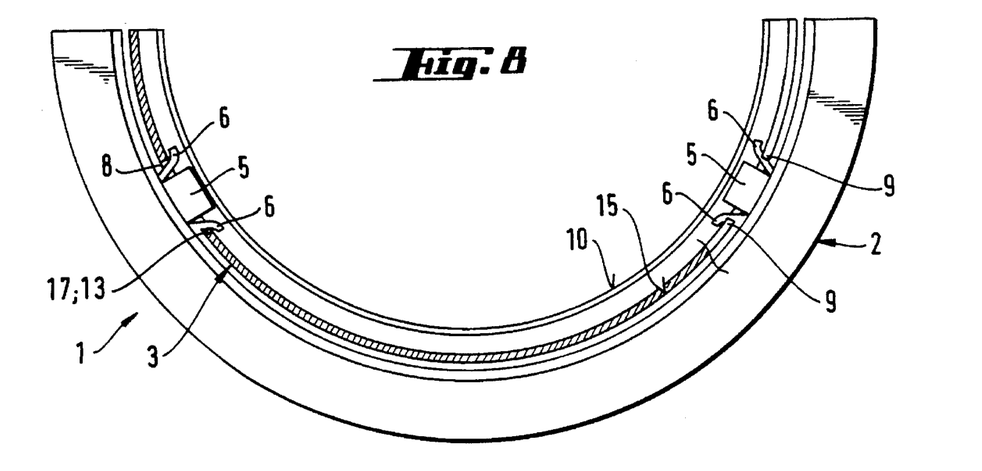
FIG. 8 is a plan view of a thrust bearing part with a cut margin of the journal bearing part of a composite plain thrust journal bearing according to FIG. 7.

A further embodiment of the plain thrust journal bearing 1 applicable for special purposes is illustrated in FIGS. 7 and 8. In this case the thrust bearing part 2 has two lugs projecting on its inner rim projecting radially inwards, both of which are attachment lugs 5. Each attachment lugs 5 is, in this example, flanked at both sides by splay fingers 6. As a consequence the attachment recesses 13, provided in the rim 7 of the journal bearing part 3, have, in contrast to the illustration in FIG. 4, a receiving slot 8 not only at one end but on both ends, each slot being delimited by a hook-shaped projection 9. For the assembly of the plain thrust journal bearing both the attachment lugs 5 of the thrust bearing part 2 are, during the positioning of the thrust bearing part 2 on the journal bearing part 3, inserted in the associated attachment recesses 13 of the journal bearing part 3. The splay fingers 6 are then splayed to both sides away from the associated attachment lug and permanently bent into the relevant receiving slot 8.

In all embodiments the guiding lugs 4 and the attachment lugs 5 and also the splay fingers 6 are made in such a way that they, in the assembled state of the plain thrust journal bearing 1, remain below the sliding surface 10 of the journal bearing part 3. The spacing 16 of the guiding lug 4 in the retaining opening 11 and the spacing 17 of the attachment lug 5 in the attachment recess 13 is much smaller than the dimensions of the receiving slot 8 and of the splay fingers 6. The spacing 16, 17 offers a defined limited mutual movability, of the journal bearing part 3 and thrust bearing part 2, but it is ensured, in spite of this movability, that the splay fingers 6 remain always and reliably in their receiving slots 8.

In FIGS. 9 to 12 the thrust bearing part is provided with a central guiding lug 4 flanked by two retaining lugs 5 at an angular distance of 30° or more. Between the central guiding lug 4 and the flanking retaining lugs 5 is formed a support rim 15 projecting with respect to the inner periphery of the thrust bearing part 2. The guiding lug 4 engages into a closed retaining opening 11, while for the two retaining lugs 5 attachment recesses 13 are made in the rim 7 of the journal bearing part 3. The inner edge 11a of the closed retaining opening 11 and the bottom edge 13a of the attachment recess 13 are aligned with each other.

Figure 9:
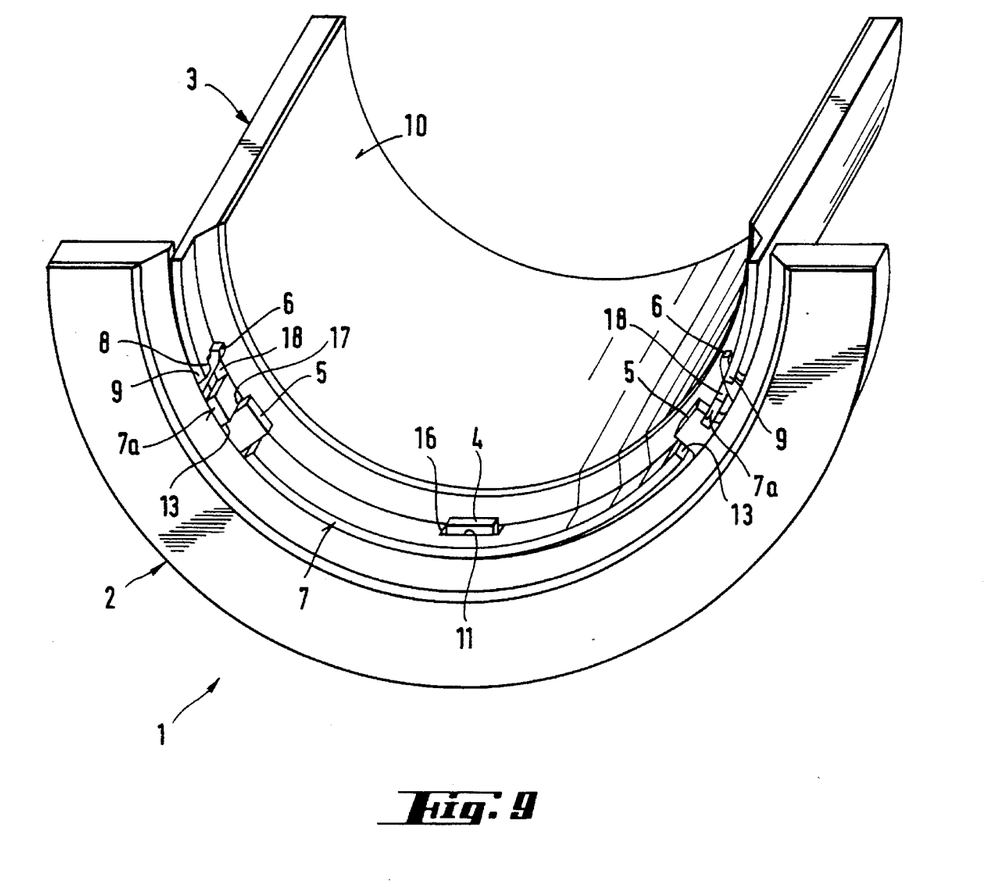
FIG. 9 is a perspective view of a composite plain thrust journal bearing in a further embodiment.
Figure 10:
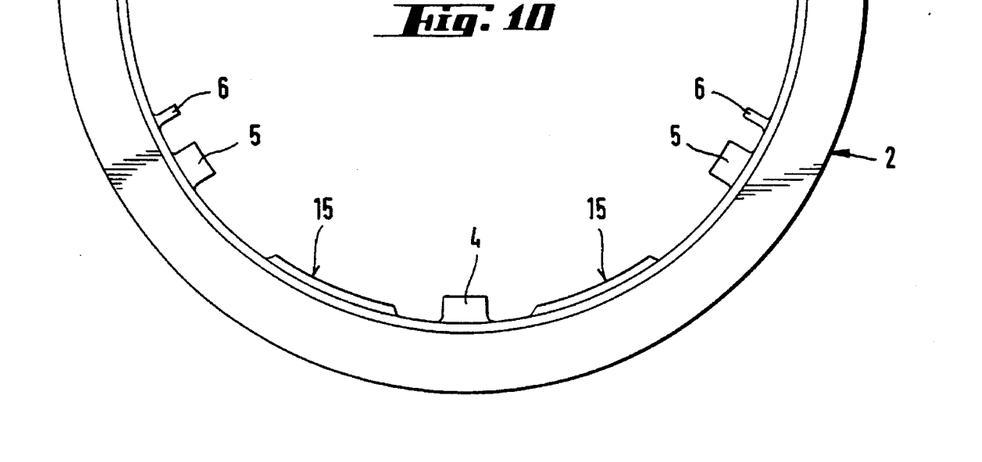
FIG. 10 is a plan view of a thrust bearing part according to FIG. 9 before assembly.

As is apparent particularly from FIGS. 9 and 10, splay finger 6, which engages into a recess 18 for a splay finger, is associated with every retaining lug 5 on the side facing away from the guiding lug 4. The attachment recesses 13 and the recesses 18 for splay fingers are separated from each other by a rim portion 7a.

Figure 12:
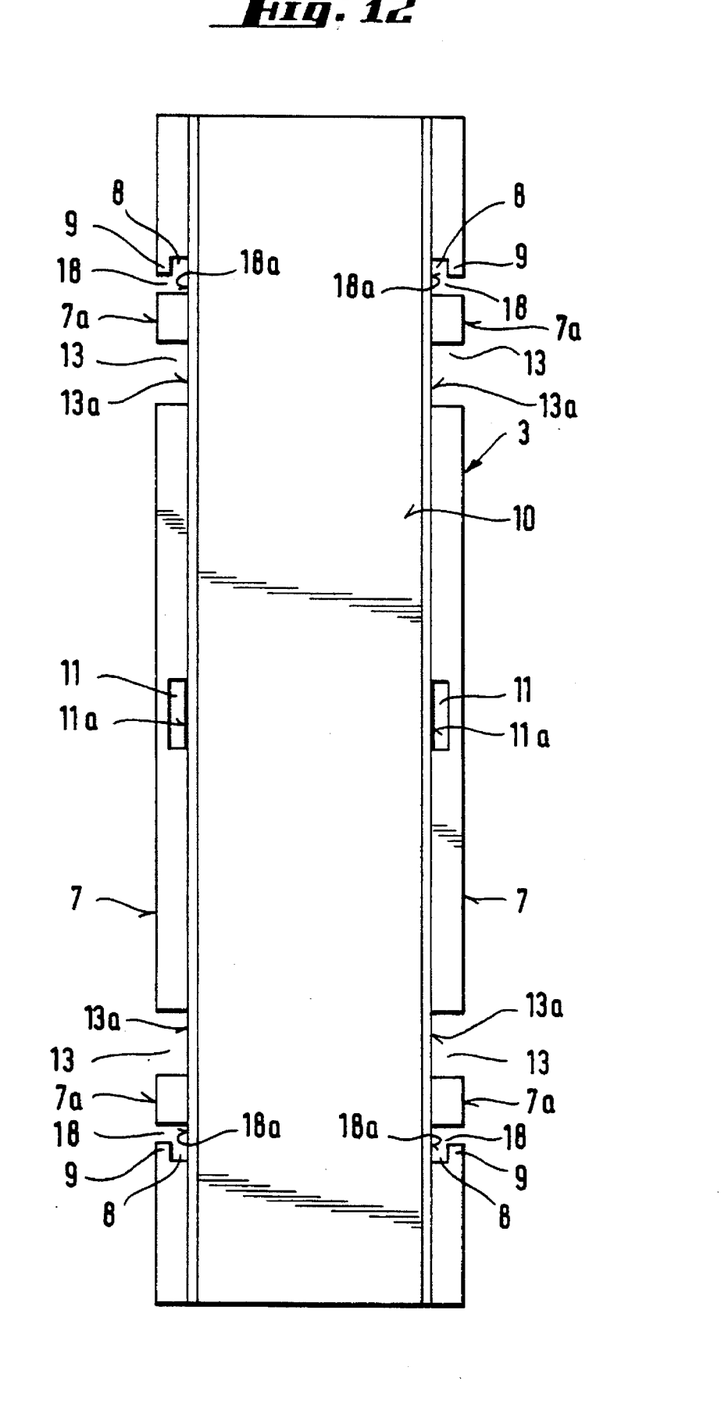
FIG. 12 is a front elevation of an unwound or flattened journal bearing part according to FIG. 9.

As is shown in FIG. 12 each of the recesses 18 for splay fingers has at its end, facing away from the attachment recess 13, a receiving slot 8 which is axially outwardly delimited by a hook-shaped projection 9 such that a support edge for the splay finger 6 is formed in the receiving slot 8 on the hook-shaped projection 9, said edge being substantially parallel to the bottom edge 18a of the recess 18 for a splay finger.

Figure 11:
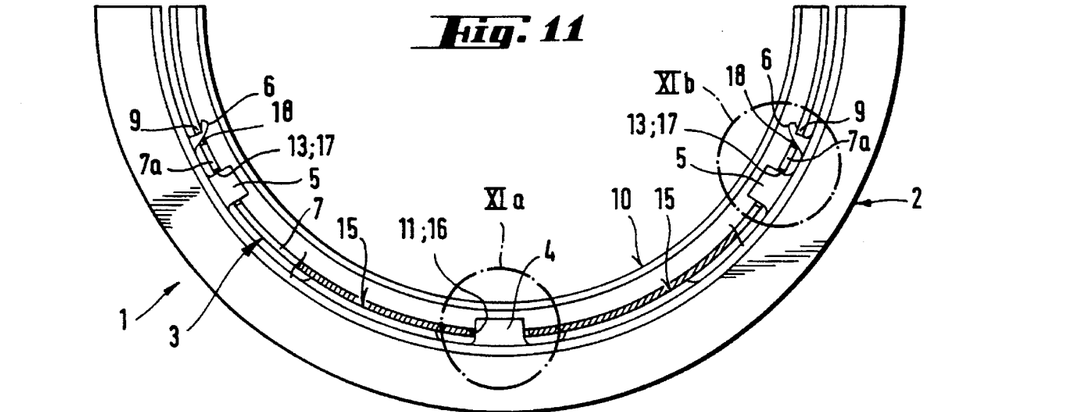
FIG. 11 is a plan view of a thrust bearing part according to FIG. 9 assembled with a journal bearing part.
Figure 11A:
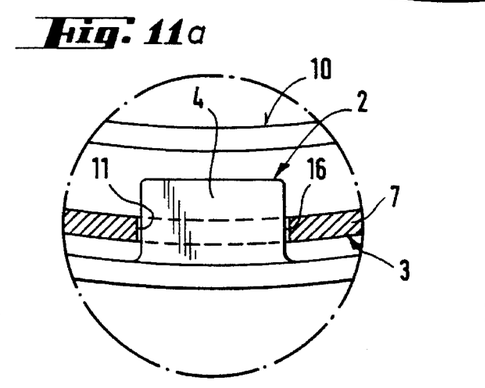
FIGS. 11a and 11b are details XIa and XIb from FIG. 11 on a larger scale.
Figure 11B:
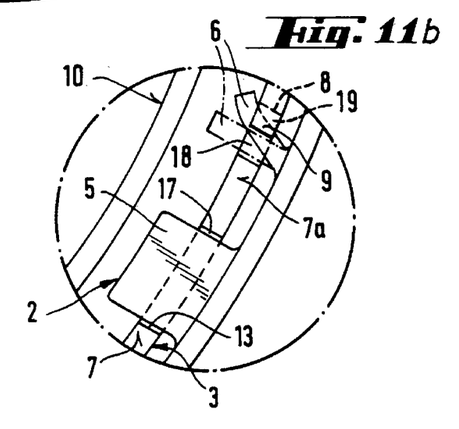

Compared to the dimensions of the guiding lug 4, the dimensions of the closed retaining opening 11 are such that the guiding lug 4 has in the closed retaining opening a certain spacing 16 in to circumferential direction of the bearing and a small spacing in the axial direction of the bearing. Also the dimensions of the attachment recess 13 and the receiving slot 8 are such that the retaining lug 5 and the splay finger 6 have a spacing in the assembled state of the plain thrust journal bearing, the spacing 17 of the retaining lug 5 and the spacing 16 of the guiding lug 4 being smaller than the spacing 19 of the splay finger (FIG. 11*b*).

For the assembly of a plain thrust journal bearing in the embodiment according to FIGS. 9 to 12 the thrust bearing part 2, which is in the state shown in FIG. 2, is first situated slightly obliquely to the end edge of the journal bearing part 3 and inserted in the apex region by the guiding lug 4 in the closed retaining opening 11 in the margin of the journal bearing part 3 until the support rim 15 engages the outer peripheral surface of the journal bearing part 3. The thrust bearing part 2 is then swung in such a way that both its attachment lugs 5 and splay fingers 6 get into the associated recesses. After that the splay fingers 6 are splayed away and are inserted with permanent deformation by bending in the corresponding receiving slot 8. The thrust bearing part 2 is thereby permanently and reliably fixed to the journal bearing part 3 and due to the spacing of the guiding lug 4 in the closed retaining opening 11, the spacing 17 of the attachment lugs 5 in the attachment recesses 13 and the spacing 19 of the splay fingers 6 in the receiving slots 8 obtains movability with respect to the journal bearing part 3 which is suitable for the assembly and operation of the bearing. Relative movement of the thrust bearing part 2 with respect to the journal bearing part 3 in the operation of the plain thrust journal bearing 1 cannot cancel the performed deformation by bending of the splay fingers 6 by bending because the contact edge of the hook-shaped projection 9, which edge is parallel to the bottom edge 18*a* of the recess 18 for a splay finger, has no wedge effect and besides the movability of the thrust bearing part 2 on the journal bearing part 3 is limited by the provided spacing 16 of the guiding lug 4 in the retaining opening 11 and the attachment lugs 5 in the attachment recesses 13.

Figure 13:
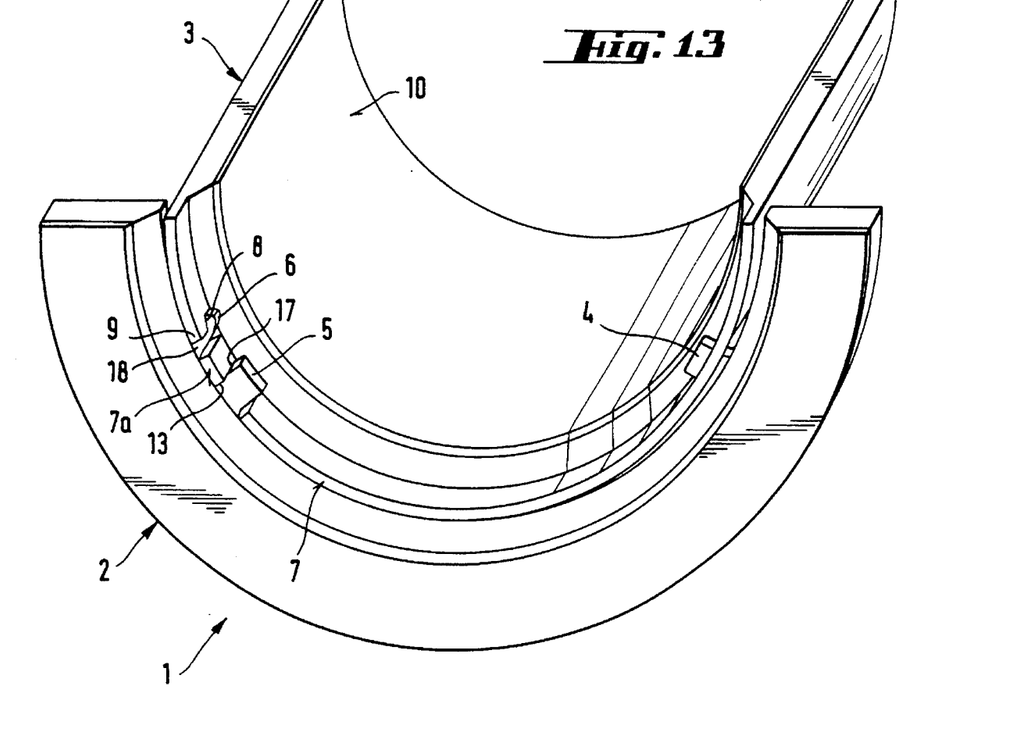
FIG. 13 is a perspective view of a composite plain thrust journal bearing in a further embodiment.
Figure 14:
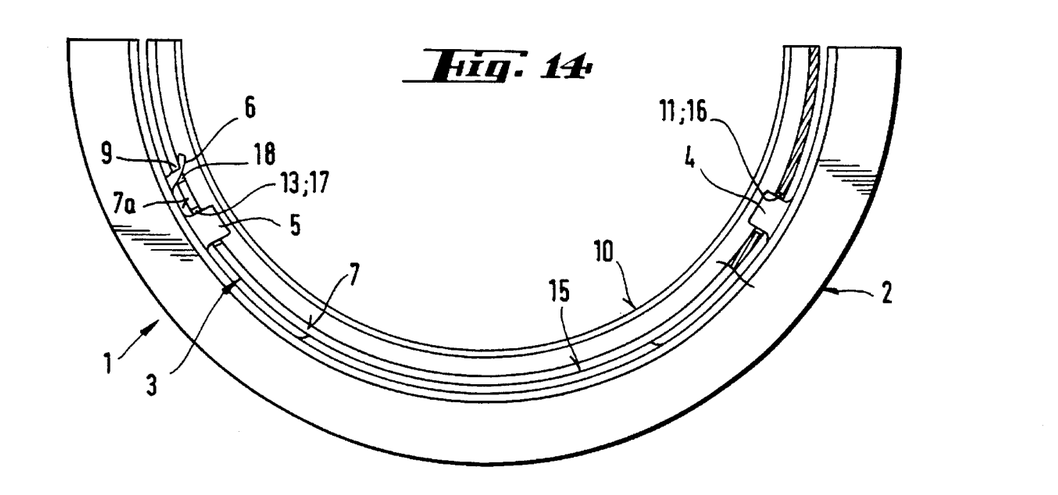
FIG. 14 is a plan view of a thrust bearing part and a journal bearing part, cut on the rim, of a plain thrust journal bearing according to FIG. 13.

In the embodiment of the plain thrust journal bearing 1 according to FIGS. 13 and 14, applicable for special purposes, the thrust bearing part 2 has only two lugs extending radially inwardly on the inner rim, namely a guiding lug 4 and an attachment lug 5. In the rim area 7 of the journal bearing part 3 is correspondingly provided a closed retaining opening 11 and an axially open attachment recess 13 and also a recess 18 for a splay finger. For the formation of the receiving slot 8 and the hook-shaped projection 9 on the recess 18 for a splay finger for the introduction of the splay finger 6 are provided the same features which have been explained above in connection with FIGS. 9 to 12. The same applies also to the spacing 16 of the guiding lug 4 in the retaining opening 11 and the spacing 17 of the attachment lug 5 in the attachment recess 13.

Figure 15:
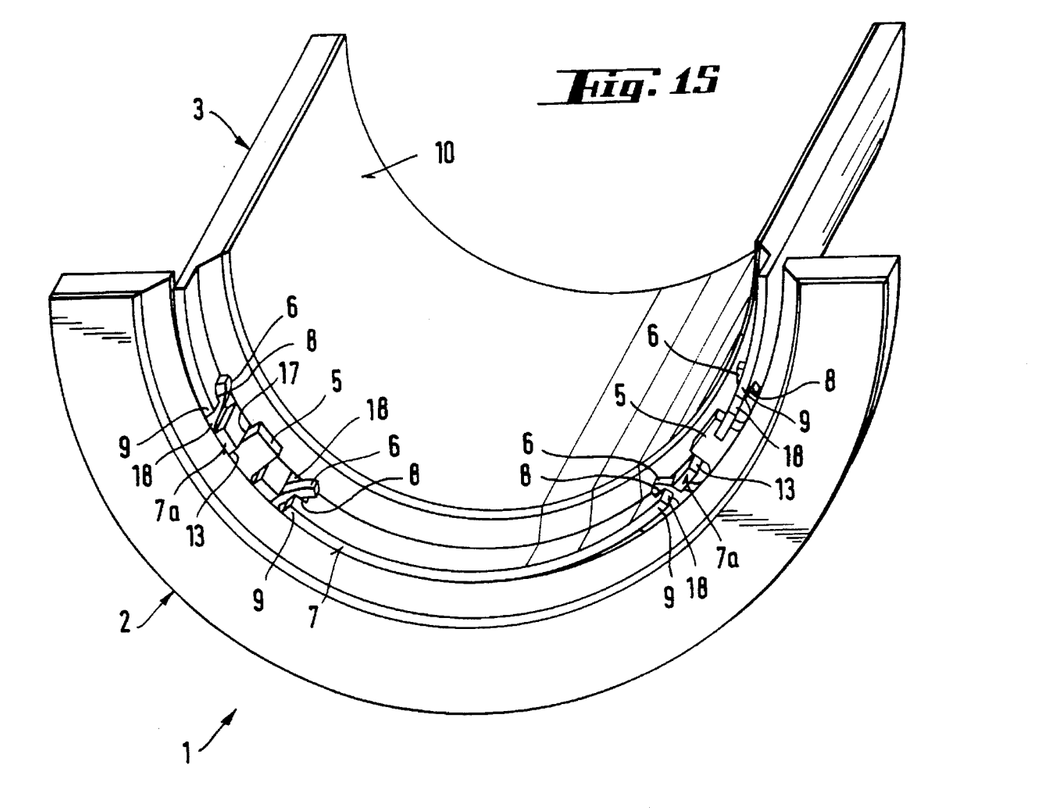
FIG. 15 is a perspective view of a composite plain thrust journal bearing in a further embodiment.
Figure 16:
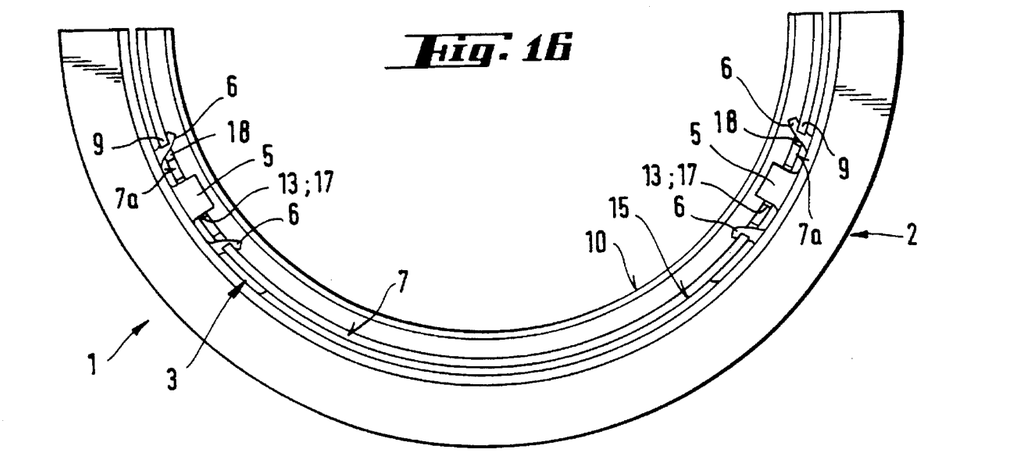
FIG. 16 is a plan view of a thrust bearing part and a journal bearing part, cut on the rim, of a plain thrust journal bearing according to FIG. 15.

A further embodiment of the plain thrust journal bearing 1 applicable for special purposes is illustrated in FIGS. 15 and 16. In this case the thrust bearing part 2 has two lugs projecting on its inner rim radially inwards, both of which are retaining lugs 5. With the retaining lugs 5 are, in this example, associated on both sides splay fingers 6. As a consequence four recesses 18 for a splay finger, are provided in the rim 7 of journal bearing part 3, each of the recesses comprising a receiving slot 8 each of which is delimited by a hook-shaped projection 9. Both the splay fingers, associated with the respective retaining lug 5, are splayed in opposite directions. Depending on the formation of the receiving slots 8 the splay fingers may be bent away from or towards the retaining lug 5.

In the assembly of the plain thrust journal bearing, during the positioning of the thrust bearing part 2 on the journal bearing part 3, the two retaining lugs 5 of the thrust bearing part 2 are inserted into the associated attachment recesses 13 of the journal bearing part 3. The splay fingers 6 are then splayed to both sides and permanently deflected into the respective receiving slot 8.

The guiding lugs 4 and the retaining lugs 5 and also the splay fingers 6 are in all embodiments so formed that they remain in the assembled state of the plain thrust journal bearing 1 below the sliding surface 10 of the journal bearing part 3. The spacing 16 of the guiding lug 4 in the retaining opening 11 and the spacing 17 of the attachment lug 5 in the attachment recess 13 is much smaller than the dimensions of the receiving slot 8 and the splay finger 6. The spacing 16, 17 offers a defined limited mutual movability of the journal bearing part 3 and thrust bearing part 2 but, in spite of this movability it is ensured that the splay fingers 6 remain always and reliably in their receiving slots 8.

I claim:

1. Composite plain thrust journal bearing having a journal bearing part in the form of a half-liner or bush on one or both sides of which is mounted a thrust bearing part in the form of a ring part or a set of thrust bearing parts, every thrust bearing part having at its inner peripheral edge at least two retaining lugs, each of which engages into a recess provided in the region of the arcuate or circular rim of the journal bearing part, at least one retaining lug being flanked, as an attachment lug, with at least one splay finger, which engages in an undercut made in the associated attachment recess of the journal bearing part, such that the retaining lugs project radially inwards at mutually opposite angular distances and such that the undercut is delimited in the axial direction of the journal bearing part by a hook-shaped projection.

2. Plain bearing according to claim 1, wherein the splay finger or fingers is or are arranged in the circumferential direction of the thrust bearing part to flank the attachment lug and is or are separated over their whole radial length by a cut or a slit from the attachment lug.

3. Plain bearing according to claim 1, wherein the thrust bearing part comprises one or more additional retaining lugs as guiding lugs without a splay finger, each of which is associated on the rim of the journal bearing part a retaining opening which is at least partly axially closed.

4. Plain bearing according to claim 3, wherein every thrust bearing part has in the apex region of its radial inner edge a guiding lug and on both sides an attachment lug, every attachment lug being flanked by a splay finger at least on the side facing away from the guiding lug.

5. Plain bearing according to claim 4, wherein the thrust bearing part has in the apex region of its inner edge a support rim projecting radially inwardly with respect to the inner edge, the support rim extending on both sides of the guiding lug.

6. Plain bearing according to claim 1, wherein the thrust bearing part has at one side of its apex region angularly spaced therefrom a guiding lug and at the other side of the apex region angularly spaced therefrom an attachment lug.

7. Plain bearing according to claim 6, wherein a splay finger is associated with each attachment lug, the finger being situated on the side of the attachment lug which faces away from the apex region of the thrust bearing part.

8. Plain bearing according to claim 6, wherein the attachment lug is flanked on both sides by a splay finger, every finger engaging in splayed state in a receiving slot of the attachment recess in which is situated the attachment lug.

9. Plain bearing according to claim 1, wherein the thrust bearing part has at both sides, in each case angularly spaced from its apex region, an attachment lug and a splay finger.

10. Composite plain thrust journal bearing part in the form of a half-liner or bush on one or both sides of which is mounted a thrust bearing part in the form of a ring part or a set of thrust bearing parts in the form of ring parts, every thrust bearing part having at its inner peripheral edge at least two retaining lugs, which project at opposite angular distance inwards and each of which engages into a recess provided in the region of the arcuate or circular rim of the journal bearing part and every thrust bearing part having at least one splay finger, wherein the retaining lugs project radially inwards at opposite angular distances and wherein the splay finger is spaced apart from the retaining lug and engages into its own recess for a splay finger in the region of an arcuate or circular rim of the journal bearing part by a hook-shaped projection formed on the rim of the recess for a splay finger.

11. Plain bearing according to claim 10, wherein the splay finger is situated in the recess for a splay finger with a spacing which is greater than that of the retaining lug in the associated attachment recess.

12. Plain bearing according to claim 10, characterised in that the splay finger or fingers are provided at one or both sides of the retaining lug spaced therefrom.

13. Plain bearing according to claim 10, wherein the thrust bearing part comprises one or more additional retaining lugs as guiding lugs with each of which is associated on the rim of the journal bearing part a retaining opening which is at least partly axially closed.

14. Plain bearing according to claim 13, wherein every thrust bearing part has in the apex region of its radial inner edge a guiding lug and at both sides a retaining lug, and wherein a splay finger is provided, spaced from each retaining lug, at least at the side facing away from guiding lug.

15. Plain bearing according to claim 14, wherein the thrust bearing part is provided in the apex region of its inner edge with a support rim projecting radially inwards with respect to the inner edge, the support rim extending at both sides of the guiding lug.

16. Plain bearing according to claim 10, wherein the thrust bearing part has at one side of its apex region, angularly spaced therefrom, a guiding lug and at the other side of the apex region, angularly spaced therefrom, a retaining lug, while at least one splay finger is provided, spaced apart from the lugs.

17. Plain bearing according to claim 10, wherein the thrust bearing part has at each of its two sides, at angular spacing from its apex region, a retaining lug, with which is or are associated one or two splay fingers.

18. Plain bearing according to claim 10, wherein two splay fingers engage in the recess for splay fingers, while every splay finger in splayed state engages into its own receiving slot.

* * * * *